Figure 1:
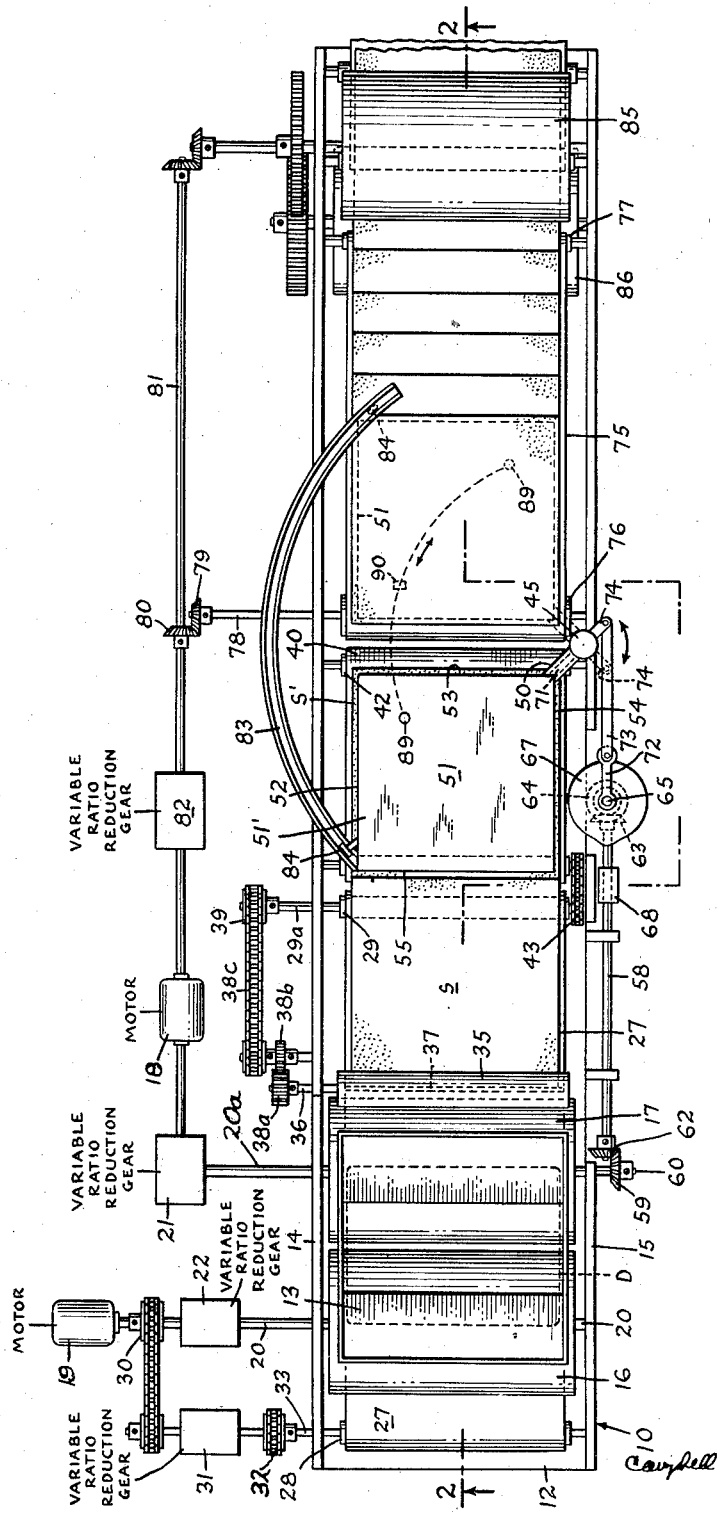

Sept. 16, 1958     E. T. OAKES     2,851,966
APPARATUS FOR SHEETING AND LAMINATING DOUGH
Filed June 21, 1954     2 Sheets-Sheet 1

FIG.I.

INVENTOR
EARLE T. OAKES
BY
HIS ATTORNEYS

Sept. 16, 1958     E. T. OAKES     2,851,966
APPARATUS FOR SHEETING AND LAMINATING DOUGH
Filed June 21, 1954     2 Sheets-Sheet 2

INVENTOR
EARLE T. OAKES
BY
Campbell, Brumbaugh, Free & Graves
HIS ATTORNEYS

United States Patent Office 2,851,966
Patented Sept. 16, 1958

---

2,851,966

APPARATUS FOR SHEETING AND LAMINATING DOUGH

Earle T. Oakes, East Islip, N. Y., assignor to The E. T. Oakes Corporation, Islip, N. Y., a corporation of New York Application June 21, 1954, Serial No. 437,969

8 Claims. (Cl. 107—1)

This invention relates to devices for making biscuits, crackers and other dough or pastry materials and it relates particularly to apparatus for making laminated sheets of dough which are used in the manufacture of crackers, biscuits and the like of light and flaky texture.

It is customary in the manufacture of many bakery products, for example, crackers, to form the cracker sheets which are baked in the oven from several layers of dough. The usual procedure in making up the cracker sheets is to pass a batch of dough through sheeting rollers which progressively work the dough down to a thinner and thinner cross-section and then to fold the dough back and fourth into an overlapping or laminated mass. The overlapping or laminated mass of dough is then passed through sheeting rollers to progressively reduce its thickness and then it may be further folded back and forth and resheeted to produce the desired number of laminations or layers. The principal disadvantage of such laminating and sheeting operations is that the dough is worked excessively. As a consequence, the dough is toughened and the products are not as light, tender or flaky as might be desired.

In my copending applications Serial No. 664,456, filed April 24, 1946, now U. S. Patent No. 2,687,699, dated August 31, 1954, and Serial No. 421,864, filed April 8, 1954, now U. S. Patent No. 2,804,831, dated September 3, 1957, I have disclosed an apparatus which overcomes practically all of the disadvantages of the prior sheeting and laminating devices by providing a sheeting roll system that is capable of reducing a mass of dough to an extremely thin sheet by passing it only once through the sheeting rollers. The apparatus also includes a mechanism for laminating the dough and passing the laminated layers of dough through other sheeting rollers acting at right angles to the first-mentioned sheeting rollers thereby to cross-roll the dough and equalize the stretching in the finished dough product so that unequal shrinkage will not take place during the baking operation with consequent mis-shaping of the baked goods.

The laminating apparatus described above is highly satisfactory for use under conditions where a right angle change of direction of the dough is not objectionable. In some bakeries, however, space requirements are such that it would be preferable to have a straight line sheeting and laminating apparatus which at the same time is capable of cross-rolling of the dough to equalize shrinkage and stresses in the finished product.

The present invention provides a straight line sheeting and laminating device which is capable of producing the desired cross-rolling of the dough.

Figure 2:
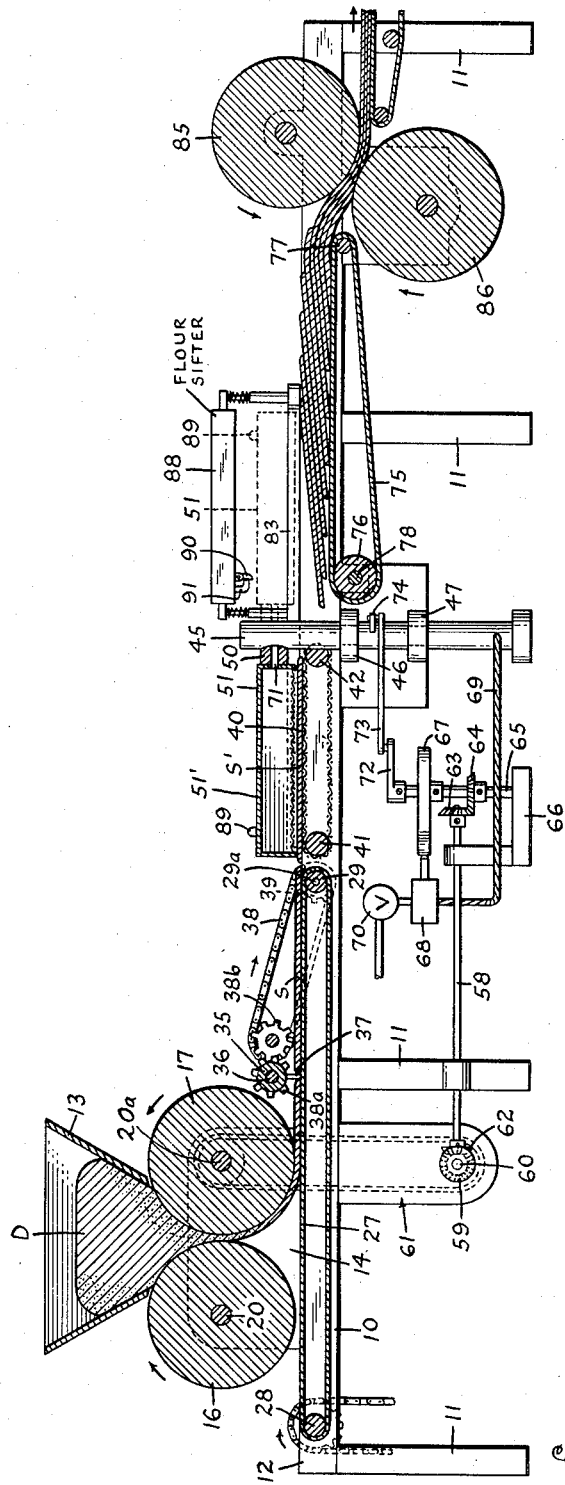

For a better understanding of the present invention, reference may be had to the accompanying drawing in which:

Fig. 1 is a plan view of a typical form of sheeting and laminating apparatus of the kind embodying the present invention; and Fig. 2 is a view in longitudinal section taken through the machine on line 2—2 of Fig. 1.

The invention will be described with reference to a typical device for producing crackers and involving the production of laminated dough sheets of suitable thickness for the crackers. It will be understood that the device also can be used for making biscuits, cakes and the like of the type formed of thin dough lamina. As shown in Figs. 1 and 2, the apparatus may be provided with a suitable frame 10 in which the several sheeting and laminating elements and the operating or drive mechanism of the machine are mounted. The frame 10 has supporting legs 11 and a table-like top portion 12 which may be of skeleton or open frame formation.

At the left-hand end of the frame 10 is a hopper 13 to receive a batch of dough D that is to be converted into a sheet. Below the hopper 13 and mounted in the side frame elements 14 and 15 which extend upwardly from the table-like portion 12 of the frame are a pair of smooth surfaced sheeting rolls 16 and 17 of the kind more particularly described in the above cited Patent No. 2,687,699. These rollers are of relatively large diameter, i. e., at least about twenty-two inches in diameter, and are capable of reducing the dough to a very thin sheet S in one pass through the rollers.

The shafts 20 and 20a of the rolls 16 and 17 are driven by means of separate motors 18 and 19, each with a variable speed control 21 and 22 so that the rolls can be driven at the same or at different speeds. Any conventional type of variable speed drive may be used, such as a variable speed cone-pulley drive of known type. In this way, the speed of rotation of the rolls 16 and 17 may be suitably adjusted in order to form the sheet S at a desired rate and to aid in preventing the dough from sticking to the rolls. The sheet S is delivered to the upper flight of an endless conveyor belt 27 which is carried on rollers 28 and 29 at its opposite ends, the rollers being mounted for rotation in the table 12. Suitable supporting rollers or the like may be disposed between the upper and lower flights of the belt 27 to prevent the upper flight from sagging. Movement of the upper flight of the conveyor belt 27 to the right may be produced by means of a sprocket 30 on the motor 19 which drives a variable speed unit 31 connected with a sprocket 32 on the end of the shaft 33 extending from the roller 28. By suitably adjusting the variable speed unit 31, the speed of the conveyor belt can be adjusted with respect to the peripheral speed of the sheeting rolls 16 and 17.

The conveyor belt 27 carries the sheet S to the right as viewed in Figs. 1 and 2 and passes it beneath a knife or cutter mechanism 35. The cutter mechanism 35 may consist of a rotary shaft 36 having one or more knife blades 37 projecting from it so that upon rotation of the shaft 36, the blade 37 will engage, travel with and sever the sheet. The shaft 36 may be driven in timed relation to the rolls 16 and 17 and the conveyor belt by means of a gear 38a at its end that engages an idler gear 38b driven by means of a chain 38c and a sprocket 39 fixed to the supporting shaft 29a for the roller 29. In this way, the sheet of dough S formed by the rolls 16 and 17 is cut into successive shorter sheets S' that are delivered successively onto a mesh conveyor 40 supported in the frame 10 at opposite ends by means of supporting rollers 41 and 42. Sprockets and a chain 43 connect the supporting roller 41 to the roller 29 to cause the mesh conveyor 40 to travel at the same speed and in the same direction as the conveyor 27. The mesh conveyor 40 may be made up of a woven wire material or it may be formed of a porous fabric or a perforated fabric or metal in order to permit air to flow freely through it.

At the right-hand end of the conveyor 40 is the upright column 45 of hollow construction which is mounted for rotation in bearing blocks 46 and 47 at one side of the frame 10 to enable the column 45 to oscillate about its vertical axis. Extending from one side of the column 45 is a hollow arm 50 which supports a box-like member 51 forming a vacuum box having a closed top 51' and closed side walls 52, 53, 54 and 55. Mesh or perforated material forms the bottom of the box 51 so that air can be drawn into the box in a manner to be described. The location of the column 45 and the size of the box 51 are such that when the box is rotated to the full line position shown in Fig. 1, it overlies at least a major portion of a shorter sheet S' of the dough which is supported on the conveyor 40. The box 51 is preferably spaced only a short distance above the upper surface of the sheet S', for example, one-eighth to one-half inch, approximately, so that when a vacuum pump is actuated to create a reduced pressure in the box 51, the sheet S' will be pushed by air pressure up against the bottom of the box 51 and can be moved bodily therewith. In order to obtain proper control of the vacuum to be drawn in the box 51, the apparatus may include a shaft 58 extending along one side of the frame 10 and driven by means of a bevel gear 59 on a cross-shaft 60 that is connected by a chain and sprocket drive to the shaft 20a of the roll 17. A cooperating bevel gear 62 on the shaft 58 meshes with the gear 59 and thereby is rotated to drive a vertical shaft 65 carried by a bracket 66 on the side of the frame 10 by means of the gears 63 and 64. Control of the vacuum pump is obtained by means of a cam 67 on the shaft 65 which cooperates with a plunger type valve 68 interposed in a conduit 69 between a vacuum pump 70 and the hollow column 45. A vacuum is drawn on the box through the hollow column 45 and a passage 71 in the arm 50 communicating with the interior of the box 51.

Movement of the shaft 45 about its axis is also controlled by means of the vertical shaft 65. A crank 72 on the shaft 65 is connected by means of a link 73 to a crank arm 74 on the column 45. The relation of the crank 72 and crank arm 74 should be such that the suction box 50 is moved from the solid line position in Fig. 1 overlying the conveyor 40 to a 90° displaced position as shown in dotted lines in Fig. 1 and overlying the left-hand end of a conveyor belt 75. Inasmuch as it is desirable to have an in-line type of apparatus, the conveyor belt 75 is in substantial alignment with the conveyor 27 and the conveyor 40 and has its left-hand end adjacent to the right-hand end of the conveyor 40. As shown in Fig. 2, the conveyor belt 75 is supported at its left-hand end by an enlarged supporting and driving roller 76 and its right-hand end by means of a small roller or a small fixed nose piece 77. The roller 76 which drives the conveyor 75 is arranged to be driven at a much lower peripheral speed than the speed of the conveyor belt 40. To that end, the roller 76 has a shaft 78 thereon connected by means of bevelled gears 79 and 80 with a shaft 81 which is driven by the motor 18. Preferably, a variable ratio reduction gear 82 is interposed between the motor and the roller 76 so that speed of the conveyor belt 75 can be regulated. In any event, the speed of the conveyor belt 75 should be so much slower than the speed of the conveyor belt 27 that the short sheets S' of dough are transferred onto the conveyor 75 by the vacuum box 51 in an overlapping relation, the extent of overlap being preferably on the order of three-quarters to seven-eighths of the length of the sheets.

It will be appreciated that the vacuum box 51 must have a reduced pressure created in it at the time the sheet S' moves directly beneath it so that each sheet can be picked up, swung horizontally into position above the conveyor 75 at which time the cam 67 will close the valve 68 thereby breaking the vacuum in the vacuum box and allowing the sheet S' to drop onto the sheets carried by the conveyor 75. Return movement of the vacuum box 51 will be caused by the crank 72 but without a vacuum or reduced pressure being drawn on the box until it overlies the next sheet supplied to the conveyor 40. If desired, the outer edge of the box 51 may be supported by an arcuate guide rail 83 fixed to the frame 10 and engaging a roller 84 carried at the outer corner of the box.

From the preceding description, it will be apparent that the dough is rolled in one direction in passing between the sheeting rolls 16 and 17 and that the vacuum box 51 in transferring the sheets from the conveyor 40 to the conveyor 75 turns each sheet 90°. Accordingly, when the laminated or stacked sheets are passed between the sheeting rolls 85 and 86 mounted on the right-hand end of the frame and driven by means of an extension of the shaft 81, the dough will be subjected to a rolling operation acting at 90° or crosswise with respect to the original rolling operation. Inasmuch as the rolls 85 and 86 may be similar in size to the rolls 16 and 17, the stack of laminations or sheets can be reduced to suitable thickness for the formation of crackers and the like by a single pass therethrough. Thus, the dough in being converted from the original mass of dough D to a cracker or biscuit sheet comprising a great many extremely thin layers of dough is subjected to only two rolling or sheeting operations so that working of the dough is kept to an absolute minimum.

If desired, a flouring device 88 may be mounted above the left-hand end of the conveyor 75 to sift flour on each sheet after the vacuum box 51 releases the sheet and returns to its position over the conveyor 40. The device 88 can be agitated by movement of the box 51 in a counterclockwise direction by a lug 89 on the box 51 engaging a pivoted lever 90 depending from the flouring device. The lever 90 pivots to enable the box 51 to move clockwise over the conveyor 75, without vibrating the device 88. When the lug 89 strikes the lever 90 on the return swing, the lever is restrained against pivoting by engagement with the stop 91 on the device 88, and the device is lifted and dropped to sift flour on the sheet. Similarly, the apparatus may be provided with a depositor at the location of the flouring device for applying fruits, nuts, sugar, etc. to each layer.

The above-described apparatus, therefore, accomplishes the desired lamination of dough in a highly efficient manner and in a manner best suited to assure the production of a tender, high quality product.

It will be understood that the apparatus is susceptible to considerable modification and that the drive mechanism for the several elements may be modified as may be required. For example, separate motors may be provided for driving the separate conveyors and sheeting elements and their speed may be regulated in accordance with known practice. Accordingly, the form of the invention described herein should be considered as illustrative and not as limiting the scope of the following claims.

I claim:

1. An apparatus for laminating and cross-rolling dough comprising sheeting means for rolling dough into a continuous strip, means to advance said strip endwise, means for cutting said strip into short sheets, means to turn said sheets about 90°, advance them in the same direction as said strip and deposit them one on another in overlapping relation and means for rolling the overlapping sheets to reduce their thickness while advancing them in the same direction as said strip.

2. An apparatus for forming laminated sheets of dough comprising first conveying means to convey a series of thin sheets of dough having upper and lower surfaces of substantial area, means for driving said conveying means to move said sheets in one direction, second conveying means in substantially end to end alignment with said first conveying means for receiving the sheets, means for driving said second conveying means to advance said sheets in substantially the same direction as said first conveying means but at a slower speed, transfer means disposed adjacent to said first and second conveying means for successively receiving said sheets from said first conveying means, turning them around an axis substantially perpendicular to their said upper and lower surfaces through an angle of about 90° and placing them on said second conveying means and means for actuating said transfer means in timed relation to said first and second conveying means for placing said sheets on said second conveying means in overlapping relation.

3. An apparatus for forming laminated sheets of dough and the like comprising a first conveying means for advancing a plurality of thin sheets of dough in end to end relation, a second conveying means approximately in end to end alignment with said first conveying means, means for moving both of said conveying means at different lineal speeds, the first conveying means being moved at a higher speed than the second conveying means, transfer means disposed adjacent to said first and second conveying means for successively lifting said sheets from said first conveying means, moving them substantially horizontally, turning them through an angle of about 90° and placing them on said second conveying means and means for actuating said transfer means in timed relation to said conveying means to move said sheets from said first conveying means to said second conveying means and place them on the latter in overlapping relation.

4. An apparatus for forming laminated sheets of dough and the like comprising first conveying means for advancing a plurality of thin sheets of dough endwise in end to end relation, a transfer member adjacent to said first means for picking up said sheets successively from said first conveying means, advancing them substantially horizontally and turning them about 90°, and second conveying means adjacent to said first conveying means and to said transfer means and in substantially end to end alignment with said first conveying means for receiving said shorter sheets, and means for operating said first and second conveying means and said transfer means in timed relation to place said sheets on said second conveying means in overlapping relation.

5. An apparatus for forming laminated sheets of dough comprising a conveyor for advancing a strip of dough, cutting means overlying said conveyor for severing said strip into short sheets of dough in end to end relation, a first conveying means substantially in end to end alignment with said conveyor for receiving the short sheets therefrom, means for driving said conveyor and said first conveying means at substantially the same lineal speed, a second conveying means substantially in end to end alignment with said first conveying means, means for driving said second conveying means slower than said conveyor and said second conveying means, a hollow transfer member having a perforated bottom mounted adjacent to said first and second conveying means for movement through approximately a 90° angle around a substantially vertical axis between a first position overlying said first conveying means and a second position overlying said second conveying means, means for producing a reduced pressure in said hollow transfer member to lift a short sheet of dough from said first conveying means and for producing an increased pressure in said transfer member to release said short sheet, and means actuating said means for producing increased and decreased pressure and for moving said transfer member from said first position to said second position in timed relation to said first and second conveying means to pick up short sheets from said first conveying means and deposit them in overlapping relation on said second conveying means.

6. The apparatus set forth in claim 5 in which said first conveying means is perforated to permit flow of air therethrough.

7. The apparatus set forth in claim 5 comprising an oscillatable column supporting said transfer member for oscillating movement between said first and second positions.

8. The apparatus for laminating and cross-rolling dough comprising a first pair of sheeting rolls for making a strip of dough, means adjacent to said first pair of sheeting rolls for cutting said strip into short sheets having top and bottom surfaces of substantial area, means adjacent to said cutting means for advancing said short sheets and successively turning them about 90° around an axis substantially perpendicular to their top and bottom surfaces and depositing them in overlapping relation one on another, and a second pair of sheeting rolls substantially parallel with said first pair for receiving said overlapping sheets and rolling them to a reduced thickness, said sheeting rollers, cutting means and turning means being arranged in substantial alignment whereby the dough is rolled in two angularly related directions by said sheeting rolls.

References Cited in the file of this patent

UNITED STATES PATENTS

| | | |
|---|---|---|
| 1,440,856 | Westcott | Jan. 2, 1923 |
| 1,454,672 | Fetaz | May 8, 1923 |
| 1,527,262 | Martin | Feb. 24, 1925 |
| 1,545,912 | Maxson | July 14, 1925 |
| 2,155,952 | Noxon et al. | Apr. 25, 1939 |
| 2,248,291 | Walborn | July 8, 1941 |
| 2,445,884 | MacManus | July 27, 1948 |
| 2,471,112 | Maull et al. | May 24, 1949 |
| 2,576,670 | Cohen | Nov. 27, 1951 |
| 2,577,925 | Sternbach | Dec. 11, 1951 |
| 2,687,699 | Oakes | Aug. 31, 1954 |
| 2,732,927 | Hansen | Jan. 31, 1956 |